United States Patent [19]

Holeman et al.

[11] Patent Number: 5,455,917
[45] Date of Patent: Oct. 3, 1995

[54] APPARATUS AND METHOD FOR FRAME SWITCHING

[75] Inventors: James E. Holeman; Robert R. Teisberg; Gary R. Morrison; David T. Heron, all of Austin; Jeffrey A. Boyd, Round Rock, all of Tex.

[73] Assignee: Tandem Computers Incorporated, Cupertino, Calif.

[21] Appl. No.: 384,346

[22] Filed: Feb. 1, 1995

Related U.S. Application Data

[63] Continuation of Ser. No. 73,658, May 4, 1993, abandoned, which is a continuation of Ser. No. 736,236, Jul. 26, 1991, abandoned.

[51] Int. Cl.[6] .................... G06F 13/14; H04Q 11/04
[52] U.S. Cl. .................... 395/287; 370/60.1; 370/94.1; 340/826; 364/241.9; 364/260; 364/260.1; 364/222.2; 364/284; 364/284.4; 364/DIG. 1; 395/823; 395/311
[58] Field of Search ........................ 395/325, 250, 395/275; 370/60.1, 85.13, 85.6, 94.1; 340/826, 825.03, 825.8

[56] References Cited

U.S. PATENT DOCUMENTS

| | | | |
|---|---|---|---|
| Re. 32,900 | 4/1989 | Orsic ............................ | 370/68 |
| 3,689,897 | 9/1972 | Sciuchetti ..................... | 340/172.5 |
| 4,228,496 | 10/1980 | Katzman et al. ............... | 364/187 |
| 4,449,183 | 5/1984 | Flahive ........................ | 395/425 |
| 4,482,996 | 11/1984 | Wilson et al. ................. | 370/60 |
| 4,484,325 | 11/1984 | Wilson et al. ................. | 370/60 |
| 4,656,627 | 4/1987 | Hasley et al. ................. | 370/60 |
| 4,845,722 | 7/1989 | Kent et al. ................... | 370/58.2 |
| 4,888,684 | 12/1989 | Lilja ......................... | 395/325 |
| 4,933,936 | 7/1990 | Rasmussen .................... | 340/825.5 X |
| 4,985,830 | 1/1991 | Atac .......................... | 395/325 X |
| 5,113,390 | 5/1992 | Hayashi et al. ............... | 370/65 |
| 5,165,021 | 11/1992 | Wu et al. ..................... | 395/250 |
| 5,179,550 | 1/1993 | Simpson ....................... | 370/54 |
| 5,189,662 | 2/1993 | Kleine-Altekamp .............. | 370/16 |
| 5,247,513 | 9/1993 | Henrion et al. ................ | 370/60 |

FOREIGN PATENT DOCUMENTS 0327203  8/1989  European Pat. Off. ........ G06F 13/14

Primary Examiner—Gopal C. Ray
Attorney, Agent, or Firm—Graham & James

[57] ABSTRACT

A data communication system embodying an apparatus and a method provides simultaneous paths between a plurality of transmit ports and a plurality of receive ports for transmitting therebetween data identifying their destination receive ports. Such data are signals which are constructed in accordance with a standard serial protocol for frame element communication, such as HDLC (High-level Data Link Control). The system is assembled in a chassis containing a backplane and multiple cards having transmit and receive ports through which the cards couple the backplane. The system includes: a receiver of data transmitted by a source transmit port, a recognizer of the destination receive port identified by the received data, a determiner of the availability of the recognized destination receive port, a connector of a path between the source transmit port and the destination receive port in response to a determination that the recognized destination receive port is available, and a transmitter of the received data to the destination receive port through the connected path.

19 Claims, 6 Drawing Sheets

APPARATUS AND METHOD FOR FRAME SWITCHING

This application is a continuation of application Ser. No. under 37 C.F.R. §1.62 of pending prior application Ser. No. 08/073,658 filed May 4, 1993 for "Apparatus and Method For Frame Switching", abandoned, which is a continuation of application Ser. No. 07/736,236 filed Jul. 26, 1991, abandoned.

BACKGROUND OF THE INVENTION

1. Field of the Invention

This invention relates to data communications systems and more particularly to systems for switching data connections between multiple communication ports.

2. Description of the Background Art

Data communication is sometimes facilitated by structuring the communicated data into discrete elements or frames. Each frame contains, in addition to the communicated information, predefined fields for error checking, frame opening and closing, and source and/or destination addressing. Moreover, each frame is typically assembled in accordance with a standard protocol such as HDLC (High-level Data Link Control) for serial communication of frame-level data.

In most frame-based communications systems, frames are communicated between multiple ports. Typically, these frames are communicated between such ports through the use of a single transmission facility such as a multi-drop serial bus which is shared by several receiving ports.

In a multi-drop arrangement, the ports are interconnected with a common bus through which each port shares the same electrical connections with the other interconnected ports. This arrangement permits each port to monitor the bus to determine whether the bus is available for frame transmission. Moreover, this arrangement permits each port to monitor the bus to detect the presence of a frame currently being transmitted on the bus. Each port may also detect where such frame is destined for reception.

The use of a single multi-drop for frame communication between multiple ports is limited, however, to the extent that only two ports may communicate through the common bus at any given time. This limitation frequently results in access to the bus being blocked heavily while a number of ports wait for the bus to become available for frame transmission.

Alternatively to using multi-drop serial buses, other communication systems use conventional parallel interfaces, such as VME (Versa-Module Eurocard), for communication of frames between multiple ports over multi-bit data paths. Such parallel interfaces feature faster frame transmission by providing a dedicated set of electrical connections such as a parallel communication bus between each of the ports over which multiple bits may be transferred simultaneously.

These dedicated sets of electrical connections allow ports to communicate directly with each other without incurring the delays that are necessarily associated with transmitting frames through a common serial bus. While each port must still wait for these dedicated set of electrical connections to become available, frame information is transferred more quickly through the parallel interface once access thereto is obtained.

The use of parallel interfaces for frame communication between multiple ports is limited, however, to the extent that numerous dedicated electrical connections having multi-bit data paths must be installed between each of the ports. Such multi-bit data paths are costlier to manufacture than single-bit data paths which are conventionally used in serial buses.

In addition, a communication system which uses such numerous connections is difficult and costly to make fault-tolerant. This difficulty arises from all ports being vulnerable to a failure on any one of the data paths when a single bit fails during transmission. Typically, fault-tolerance would be achieved by providing redundant data paths for each of the transmitted data and address bits.

SUMMARY OF THE INVENTION

The invention is a data communication system embodying an apparatus and a method for providing paths between a plurality of transmit ports and a plurality of receive ports for transmitting therebetween data identifying their destination receive ports.

The system includes: a receiver of data transmitted by a source transmit port, a recognizer of the destination receive port identified by the received data, a determiner of the availability of the recognized destination receive port, a connector of a path between the source transmit port and the destination receive port in response to a determination that the recognized destination receive port is available, and a transmitter of the received data to the destination receive port through the connected path.

DESCRIPTION OF THE PREFERRED EMBODIMENT

Figure 1:
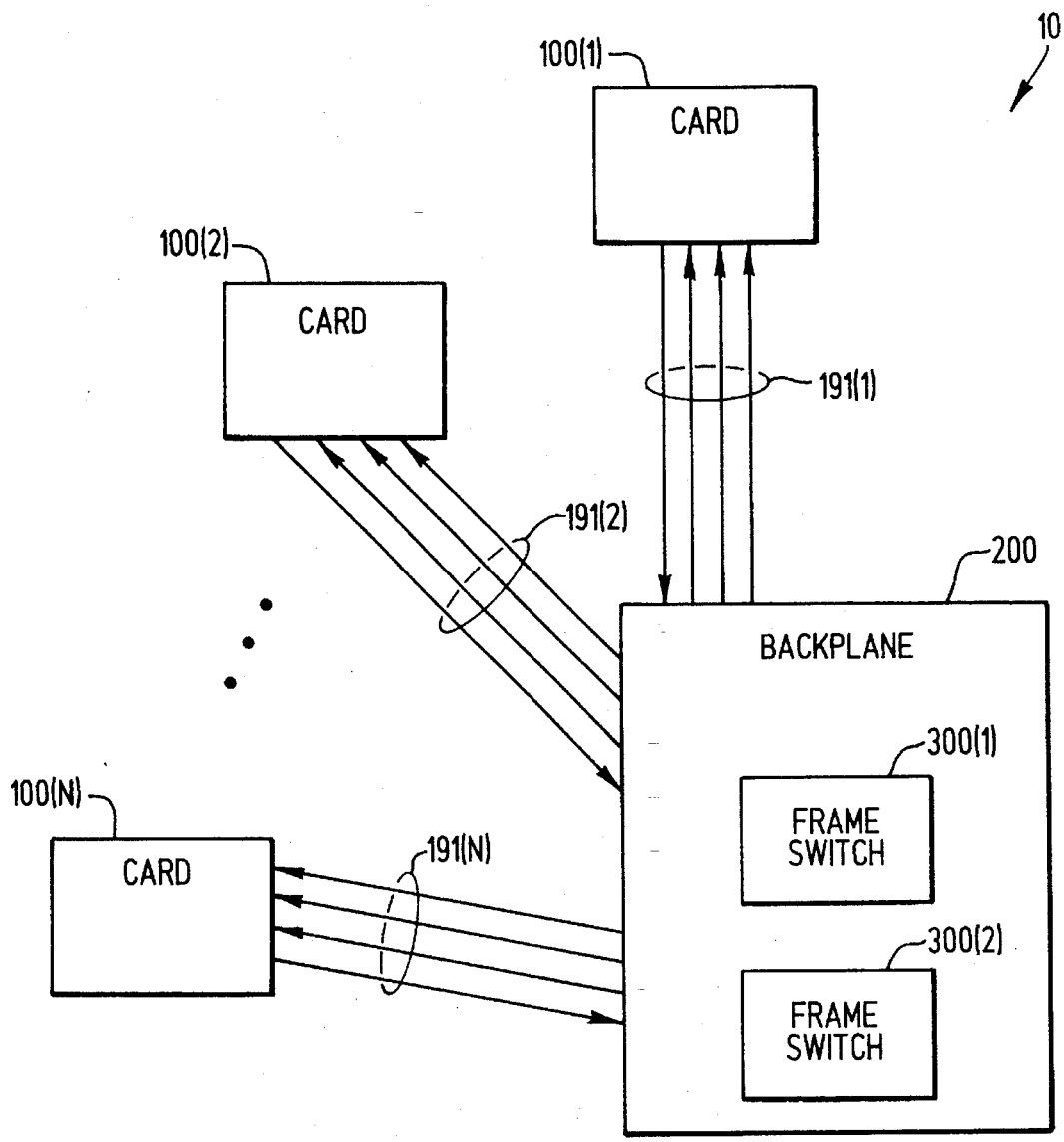
FIG. 1 is a block diagram of a data communication system 10 having a backplane 200 coupled to a plurality of cards 100.

FIG. 1 is a block diagram of a data communication system 10. System 10 is shown having a backplane 200 coupled to a plurality of cards 100(1) to 100(N), where N is preferably 48. System 10 embodies an apparatus and a method for switching connections between cards 100 through backplane 200. A plurality of multi-signal data paths 191(1) to 191(N) couple cards 100 to backplane 200.

Preferably, system 10 is assembled in a single integrated chassis where cards 100 correspond to electronic controller boards contained in the chassis, and backplane 200 corresponds to a communications backplane which couples the boards together electrically and mechanically.

Preferably, system 10 includes 48 controller boards which are disposed in a communications processor chassis. The boards are disposed symmetrically relative to the communications backplane. This symmetrical disposition permits data paths 191 between the boards and the communications backplane to be routed radially from the communications backplane. Such radial routing improves fault containment in system 10 and permits pairs of cards 100 to send data to each other simultaneously.

Backplane 200 contains a pair of frame switches 300(1) and 300(2) for switching connections between cards 100. Data paths 191 couple cards 100 to frame switches 300 in backplane 200. Only one of the frame switches 300(1) is essential for backplane 200 to switch connections. The other frame switch 300(2) is coupled redundantly to data paths 191 to serve as back-up for improving the fault-tolerance of system 10.

Figure 2:
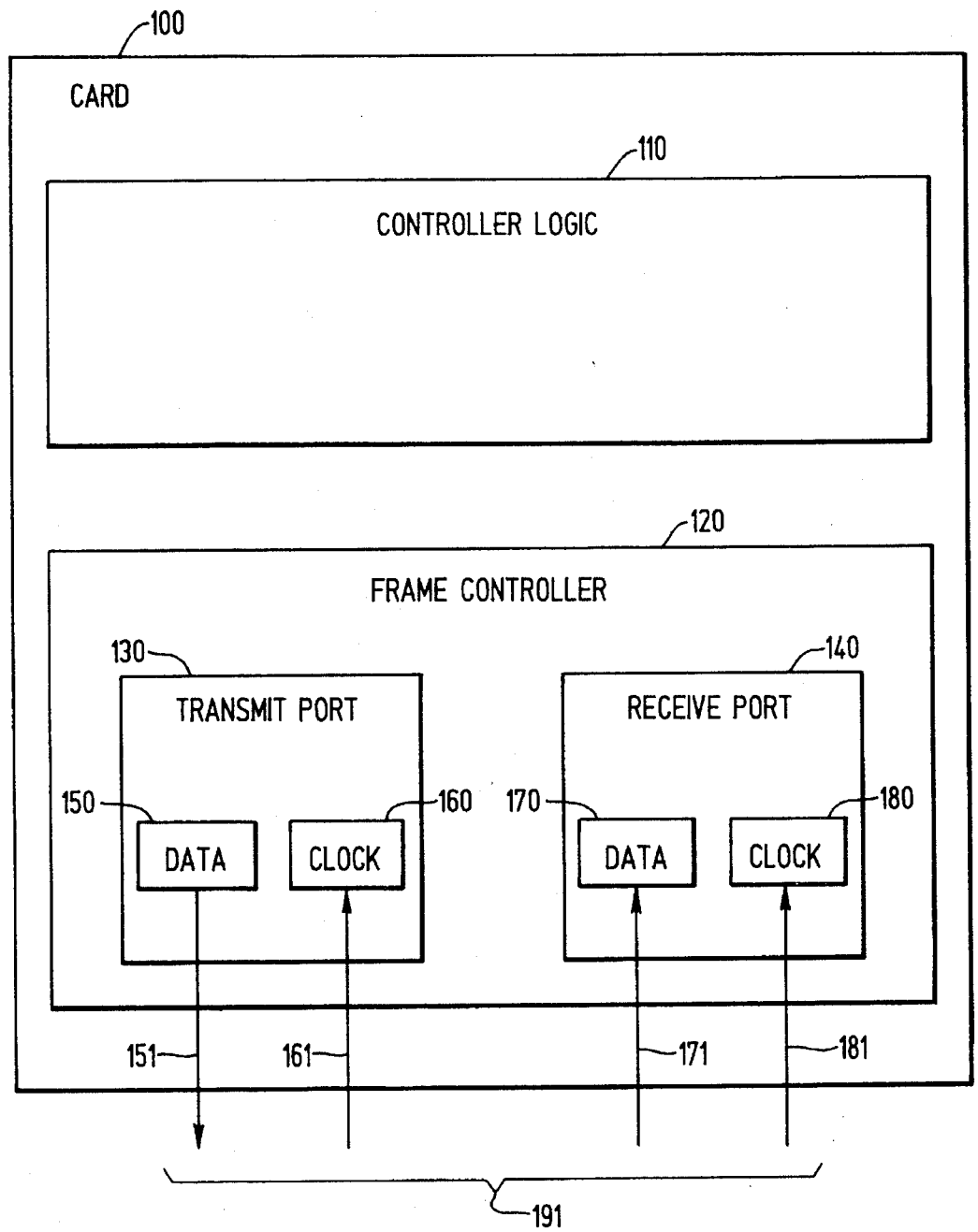
FIG. 2 is a block diagram of card 100 having controller logic 110 and a frame controller 120.

FIG. 2 is a block diagram of card 100. Card 100 is shown having controller logic 110 and a frame controller 120. Card 100 serves various functions as defined by the configuration of controller logic 110. For instance, controller logic 110 may be configured as a synchronous controller, an asynchronous controller, or a local-area network interface controller. In an alternate embodiment of system 10, some controller boards or cards 100 may each contain multiple frame controllers 120 and controller logic 110.

Frame controller 120 functions as a conventional controller for frame-based communication. In particular, frame controller 120 functions to perform low-level communication tasks such as frame assembly and dis-assembly in accordance with a standard protocol. Thus, having frame controller 120 perform such tasks improves the overall performance of system 10 by relieving high-level software or hardware in controller logic 110 from necessarily performing such tasks. In the present embodiment, frame controller 120 is a Motorola 68605 HDLC controller.

Frame controller 120 includes a transmit port 130 and a receive port 140. Transmit and receive ports 130, 140 couple data path 191. Transmit port 130 contains a transmit data port 150 which transmits a transmit data signal 151, and a transmit clock 160 which receives a transmit clock signal 161. Transmit clock 160 is normally free-running.

Receive port 140 contains a receive data port 170 which receives a receive data signal 171, and a receive clock port 180 which receives a receive clock signal 181. Receive clock signal 181 is always free-running. Signals 151, 161, 171, and 181 comprise data path 191.

Figure 3:
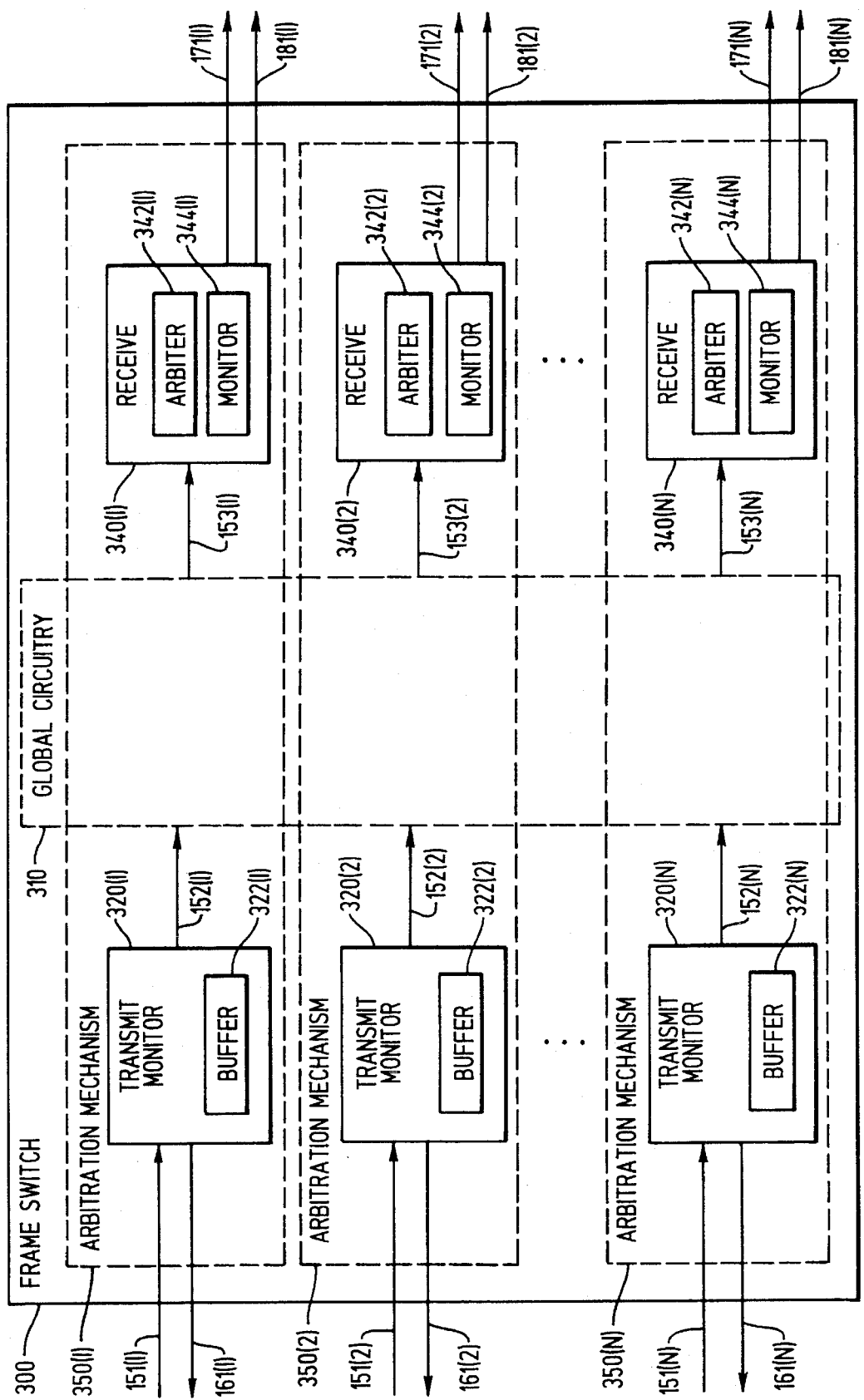
FIG. 3 is a block diagram of a frame switch 300 included in backplane 200 of FIG. 1.

FIG. 3 is a block diagram of frame switch 300. Frame switch 300 receives, routes, and transmits data to and from cards 100. Preferably, frame switch 300 is an Application-Specific Integrated Circuit (ASIC). The ASIC is mounted to a special card which may then be detachably mounted or plugged into backplane 200.

Such ASIC complies with IEEE 1149.1 standard for device testing, and features: boundary scan on all I/O pins; a by-pass register; an on-board ring-oscillator with an output frequency between 500 Khz and 1 Mhz; an identification register containing a unique ASIC ID number, a revision number, and manufacture code; internal scan chains for all internal flip-flops; Built-In Self-Tests (BISTs); a dedicated pin providing asynchronous tri-state of all outputs; and a dedicated pin providing asynchronous reset.

Frame switch 300 includes a plurality of transmit circuits 320(1) to 320(N) and a plurality of receive circuits 340 (1) to 340 (N) . Transmit circuits 320 (1) to 320(N) receive respectively transmit data signals 151(1) to 151 (N) and transmit respectively transmit clock signals 161(1) to 161(N). Each transmit circuit 320 is coupled through data path 191 to frame controller 120 in a corresponding card 100.

Receive circuits 340(1) to 340(N) transmit respectively receive data signals 171 (1) to 171 (N) and transmit respectively receive clock signals 181(1) to 181(N). Each receive circuit 340 is coupled through data path 191 to frame controller 120 in a corresponding card 100.

Transmit circuits 320 monitor transmit data signals 151(1) to 151(N). Transmit circuits 320 also produce transmit clock signals 161 (1) to 161 (N) and assembled transmit data signals 152(1) to 152(N). Transmit circuits 320 include buffers 322(1) to 322(N) for storing portions of transmit data signals 151 which identify the destination of such signals 151.

Receive circuits 340 include receive arbiters 342(1) to 342 (N) and receive monitors 344 (1) to 344 (N) . Receive circuits 340 receive routed transmit data signals 153(1) to 153(N) .

Global circuitry 310 is arranged between transmit circuits 320 and receive circuits 340 for routing data therebetween. Global circuitry 310 receives assembled transmit data signals 152 from transmit circuits 320, which global circuitry 310 then routes to produce routed transmit data signals 153 for receive circuits 340.

Arbitration mechanisms 350(1) to 350(N) each includes one of transmit circuits 320, one of receive circuits 340, and a portion of global circuitry 310. Arbitration mechanisms 350 need not have corresponding transmit and receive circuits 320, 340, notwithstanding the manner in which FIG. 3 illustrates arbitration mechanisms 350. For instance, arbitration mechanism 350 (2) may include transmit circuit 320 (2) and receive circuit 340 (5).

Figure 4:
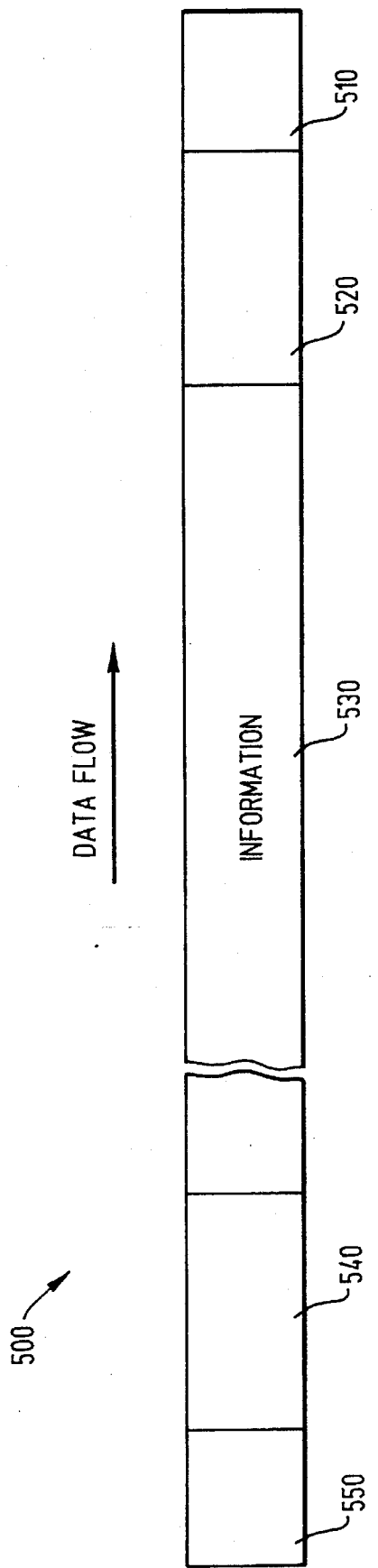
FIG. 4 is a block diagram of a data frame 500.

FIG. 4 is a block diagram of a data frame 500. Data frame 500 is representative of a data format for signals, such as transmit data signal 151 and receive data signal 171, which are appropriately received, routed, and transmitted by frame switch 300. Preferably, data frame 500 is formatted in accordance with a standard protocol, such as HDLC, for serial communication of frame-level data.

Data frame 500 includes a variable-length information field 530 and various fixed-length fields 510, 520, 540, and 550 for controlling data transfer. Field 510 is an 8-bit opening flag for indicating the beginning of data frame 500. Field 520 includes an 8-bit address field and an 8-bit control field for identifying the destination and source of data frame 500. The 8-bit control field handles flow control and acknowledgment between data frame 500 transmitter and receiver. Field 540 is a 16-bit error-checking field. Field 550 is an 8-bit closing flag for indicating the end of data frame 500.

Since data frame 500 flows serially in the direction indicated by the arrow which is shown, the address field in field 520 always precedes information field 530 during data transmission. This precedence allows frame switch 300 to capture the content of the address field in data frame 500 while data frame 500 is transmitted from its source.

In accordance with an important aspect of the present invention, upon recognizing the destination address in field 520 of data frame 500, frame switch 300 then routes a path connection to such destination. Routing is accomplished prior to such destination receiving the entire data frame 500.

When system 10 is operating, data frame 500 is transferred from a source transmit port 130 in card 100 to frame switch 300. Frame switch 300 then receives, routes, and transmits that data frame 500 to a destination receive port 140 in card 100.

Source transmit port 130 is the particular transmit port 130 from which a particular data frame 500 is transmitted. Destination receive port 140 is the particular receive port 140 which that particular data frame 500 identifies as its receiving destination.

Figure 5:
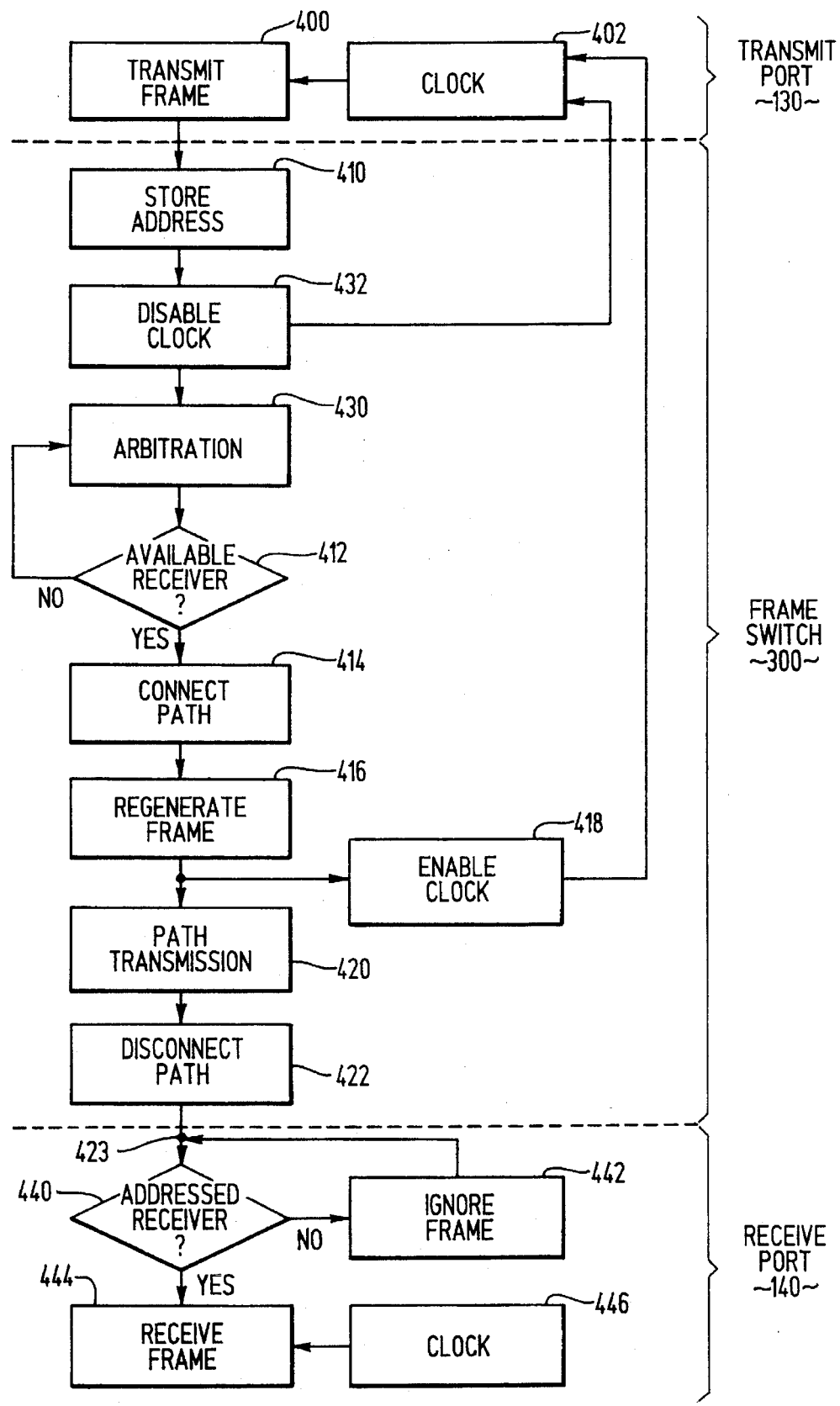
FIG. 5 is a flow chart showing the steps for communicating data frame 500 between source transmit port 130 and destination receive port 140 through frame switch 300.

FIG. 5 is a flow chart showing the steps for communicating data frame 500 between source transmit port 130 and destination receive port 140 through frame switch 300.

Beginning at step 400, source transmit port 130 in card 100 transmits data frame 500. Transmission is performed by frame controller 120, preferably at a data transmission rate of at least 10 megabits per second (Mbps). Data frame 500 is transmitted serially from transmit data port 150 as transmit data signal 151, preferably according to HDLC protocol.

Data frame 500 may be communicated in accordance with other protocols such as SDLC (Synchronous Data-Link Control) for transmitting and receiving data frames, packets, datagrams, and like data elements. The protocol, however, must communicate data elements which identify their destination, and the destination must be identified at the beginning of the data element.

At step 402, transmit clock 160 synchronizes transmission at step 400 by source transmit port 130. Multiple source transmit ports 130 may transmit simultaneously with each other when transmit clock 160 of each source transmit port is enabled to run. Although transmit clock 160 is normally free-running, it may be disabled by transmit clock signal 161 being held in a disabling state, preferably "high." Transmit clock 160 is re-enabled by clock signal 161, being held in an enabling state, preferably "low."

At step 410, frame switch 300 receives data frame 500 which was transmitted at step 400 from card 100. In particular, transmit circuit 320 receives data frame 500 as transmit data signal 151. Transmit circuit 320 then interrupts the transmission of data frame 500 to dis-assemble data frame 500 and recognize its destination receive port 140.

Recognition of destination receive port 140 occurs as transmit circuit 320 stores into buffer 322 an identifier included in the 8-bit address field of field 520. Such identifier identifies a unique destination address of data frame 500, preferably a particular slot number corresponding to destination receive port 140.

Upon storing the identifier address at step 410, transmit clock 160 is disabled by frame switch 300 at step 432. As a result, signal 161 is held in a high, disabling state, and transmit clock 160 is disabled to block transmission of data frame 500 until a connection is established to an available destination receive port 140.

If an invalid slot number or destination address is recognized by transmit circuit 320, then transmit clock 160 is re-enabled by frame switch 300. As a result of re-enabling transmit clock 160, currently-received data frame 500 is "lost." Such lost data may be recovered subsequently by higher levels of communication protocol which conventionally includes error-checking for re-sending lost data.

Once transmit clock 160 is disabled at step 322, frame switch 300 causes arbitration mechanism 350 at step 430 to arbitrate among those source-transmit ports 130 that transmit data frames 500 identifying a common unavailable destination receive port 140. Thus, when such common receive port 140 is unavailable, arbitration mechanism 350 allows another transmit port 130 to vie for its identified destination receive port 140.

Arbitration mechanism 350 defines availability by assigning priority of access to the common destination receive port 140. Such availability is assigned in a substantially random manner among the arbitrated source transmit ports 130. This random assignment results in a statistically "fair" distribution of access among such transmit ports 130.

After performing arbitration at step 430, frame switch 300 causes receive monitor 344 in receive circuit 340 at decision step 412 to determine whether the recognized destination receive port 140 is available for receiving data frame 500. If such receive port 140 is determined to be unavailable, then arbitration step 430 is repeated.

If receive monitor 344 determines at decision step 412 that the recognized destination receive port 140 is available, frame switch 300 at step 414 connects a path between source transmit port 130 and destination receive port 140. In particular, global circuitry 310 routes the path by forming a dedicated electronic connection between source transmit port 130 and destination receive port 140.

Once the path is connected at step 414, frame switch 300 regenerates data frame 500 at step 416 by re-assembling its fields according to HDLC protocol. The identifier stored in buffer 322 is retrieved for inclusion in field 520 of re-assembled data frame 500.

After data frame 500 is regenerated at step 416, frame switch 300 transmits data frame 500 to destination receive port 171 at step 420. In particular, data frame 500 is transmitted from receive monitor 344 as receive data signal 171. As mentioned before, transmission of data frame 500 occurs serially, preferably according to HDLC protocol and at a data transmission rate of at least 10 Mbps.

Upon completion of the transmission of data frame 500 at step 420, frame switch 300 causes global circuitry 310 to disconnect the connected path at step 422. Moreover, even prior to completion of the transmission, the connected path may be disconnected if timer 346 in receive monitor 344 detects that a particular source transmit port 130 has been connected to a particular destination receive port 140 longer than a specified time-out period. This period serves to indicate that an inordinate amount of time for transmitting data frame 500 has passed.

Upon regeneration of data frame 500 at step 416, frame switch 300 causes arbitration mechanism 350 at step 18 to enable transmit clock 160 of another source transmit port 130 which has been newly-assigned access to transmit data frame 500. While any particular transmit clock 160 is enabled, any or all other source transmit ports 130 may simultaneously transmit data frame 500 over another data path 191. In this way, arbitration mechanism 350 enables transmit clocks 160 of various source transmit ports 130 independently of other transmit ports 130.

At decision step 440, destination receive port 130 receives data frame 500 as receive data signal 171 from frame switch 300. Frame controller 120 then determines whether the identifier in address field 520 of received data frame 500 identifies the slot number corresponding to that destination receive port 130.

If frame controller 120 determines that received data frame 500 does not identify that particular destination receive port 140, then data frame 500 is ignored at step 442.

Notwithstanding conventional frame controllers 120 performing decision step 440 and step 442, frame switch 300 functions to ensure that data frames 500 are always routed and transmitted to their identified destination receive ports 140. Accordingly, the occurrence of decision step 440 and step 442 are unnecessary for system 10 to function properly. As a result of this feature, system 10 permits cards 100 to communicate with backplane 200 as though it were a conventional multi-drop serial bus, i.e., without modifying conventional communications software, but with significantly improved efficiency.

If frame controller 120 determines at decision step 440 that received data frame 500 identifies that particular destination receive port 140, then data frame 500 is received by frame controller 120 according to HDLC protocol at step 444.

Receive clock 180 synchronizes frame reception by frame controller 120 at step 446. Receive clock 180 is generated by frame switch 300 as a reference timing signal, which is always running.

Thus, except in situations where many transmit ports 140 wish to communicate with a common destination receive port 130, the period during which transmit clocks 160 are disabled is substantially shorter than the period during which such transmit ports 140 must wait for a conventional multi-drop serial bus to become available. In addition, system 10 takes advantage of the radial routing of data paths 191 to and from backplane 200 to provide fault-tolerant, simultaneous connections having reduced synchronization and addressing overhead while employing standard software and communication protocol.

Figure 6:
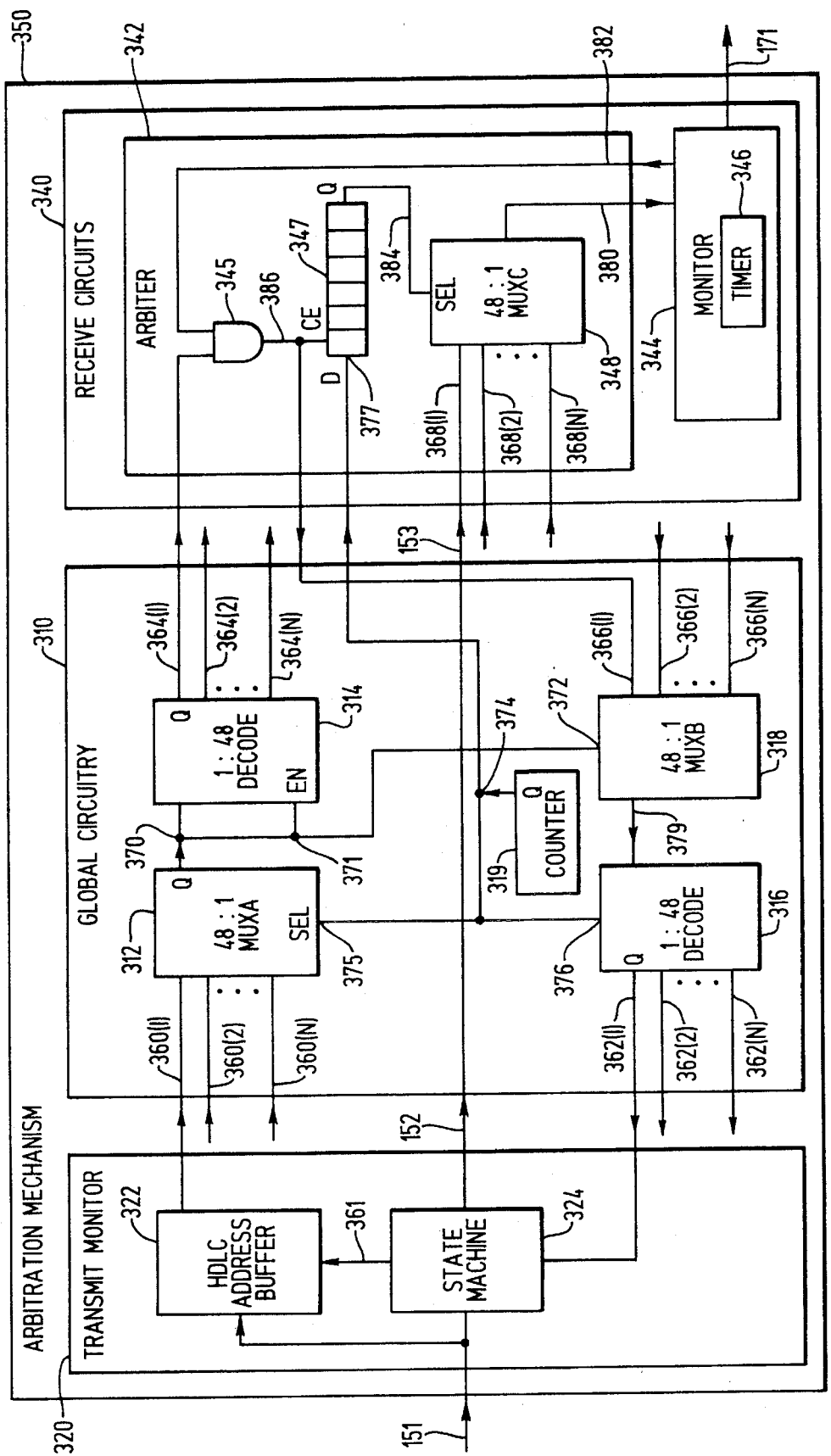
FIG. 6 is a block diagram of an arbitration mechanism included in frame switch 300.

FIG. 6 is a block diagram of arbitration mechanism 350. As described above, arbitration mechanism 350 includes particular portions of transmit circuit 320, global circuitry 310, and receive circuit 340.

In arbitration mechanism 350, transmit circuit 320 includes a state machine 324 and buffer 322 which stores the identifier from field 520 for identifying destination receive port 140. Moreover, global circuitry 310 in arbitration mechanism 350 includes a pair of preferably 48:1 multi-plexers (MUXA) 312 and (MUXB) 318, a pair of preferably 1:48 decoders 314, 316, and a counter 319. Within receive circuit 340 in arbitration mechanism 350, receive arbiter 342 includes a two-input AND-gate 345, a 6-bit register 347, and preferably 48:1 multiplexer (MUXC) 348. Receive monitor 344 includes a timer circuit 346 for measuring the duration of data connection.

When operating, arbitration mechanism 350 receives data frame 500 in the form of transmit data signal 151. Data frame 500 enters state machine 324 serially. As it enters state machine 324, data frame 500 is dis-assembled into its separate fields which are stored temporarily.

State machine 324 monitors income transmit data signal 151 to detect address field 520. As address field 520 is detected, state machine 324 asserts a detect signal 361 to cause the contents of address field 520 to be stored in buffer 322, one bit at a time. Thus, only the address of destination receive port 140 is stored. Buffer 322 is a serial-in/parallel-out shift register which deserializes the contents of address field 520 directly from transmit data signal 151 upon assertion of signal 361.

Upon receiving select decode signal 362 from global circuitry 310, state machine 324 re-assembles data frame 500 to produce assembled transmit data signal 152. Assembled transmit data signal 152 comprises received transmit data signal 151 which merely passes through global circuitry 310 without being altered. Upon passing through global circuitry 310, assembled transmit data signal 152 then becomes routed transmit data signals 153(1) to 153(N).

During re-assembly, state machine 324 regenerates opening flag in field 510, causes buffer 322 to regenerate address field 520, and then re-starts transmit clock 160 of source transmit port 130 to allow transmission of data frame 500 to complete.

Each transmit circuit 320(1) to 320(N) respectively retrieves stored identifier from buffer 322 to produce routing addresses 360 (1) to 360 (N). Routing addresses 360 are received by global circuitry 310 at MUXA 312. MUXA 312 produces a MUXA output 370 which enables and is received as input by decoder 314. MUXA output 370 is also applied to a select pin 372 of MUXB 318.

Counter 319 in global circuitry 310 produces a count signal 374 which counts preferably from 0 to 47 repetitively. Count signal 374 identifies a particular transmit port 140 which is currently assigned access to vie for its destination receive port 130. Count signal 374 is applied to a select pin 375 of MUXA 312, a select pin 376 of decoder 316, and an input pin 377 of register 347 of receive arbiter 342(1) to 342(N), respectively.

Decoder 314 produces decoded outputs 364(1) to 364(N) which are received as one of the inputs to AND-gate 345 of respective receive arbiters 342(1) to 342(N). Output pin 386 of AND-gate 345 of receive arbiters 342(1) to 342(N) is applied respectively to MUXB inputs 366(1) to 366(N) and to clock enable (CE) input of register 347.

Receive monitor 344 produces a connect signal 382 to indicate whether a connection to receive monitor 344 is possible. If connect signal 382 is produced, then receive monitor 344 indicates to receive arbiter 342 that such destination receive port 140 is available for receiving transmission of data frame 500.

Connect signal 382 is applied to one of the inputs of AND-gate 345. Output pin 386 is applied to CE input of register 347. Output 384 of register 347 is applied to a select pin of MUXC 348.

MUXC produces a receive data output 380 which is received by receive monitor 344 and passed through receive monitor 344 without alteration to become receive data signal 171.

In summary, system 10 provides an apparatus and method for improved serial communication of frame-based data elements. As described herein, system 10 features low-cost, low-latency, fault-tolerant, and high-performance frame switching. In particular, system 10 retains the self-addressing advantages of previous frame-based communication systems. Additionally, system 10 employs traditional multi-drop serial bus programming with little or no modification through the use of already-existing software and protocol.

We claim:

1. Apparatus for providing paths between a plurality of transmit ports and a plurality of receive ports, for transmitting therebetween data identifying a respective receive port, the apparatus comprising:

receiving means, coupled to the transmit ports, for receiving data transmitted by a plurality of transmit ports;

recognizing means, coupled to the receiving means, for recognizing a respective receive port identified by the data received from each of the plurality of transmit ports;

determining means, coupled to the recognizing means, for determining an availability of each recognized receive port;

connecting means, coupled to the determining means, for connecting a respective path between each of the plurality of transmit ports and each recognized respective receive port, in response to a determination that a recognized respective receive port is available; and transmit enabling means, coupled to the connecting means for enabling simultaneous transmission of data between each of the plurality of transmit ports and each recognized respective receive port through the respective paths, wherein the data transmitted by each transmit port comprises a frame having an information field and an address field, the address field including an identifier for identifying a respective receive port for receiving the frame and wherein the recognizing means disassembles each frame into separate field for recognizing the identified receive port, the recognizing means having means for storing the identifier during frame dis-assemby.

2. The apparatus in claim 1, wherein:

the recognizing means retrieves the stored identifier from the storing means to re-assemble the frame, responsive to the connecting means connecting a respective path from a respective transmit port to the recognized respective receive port.

3. The apparatus in claim 1, wherein:

the identifier comprises a backplane slot number corresponding to the receive port identified by the identifier.

4. The apparatus in claim 1, wherein:

the address field precedes the information field during frame transmission.

5. The apparatus in claim 1, wherein:

the length of the information field is variable, and the length of the address field is fixed.

6. The apparatus in claim 5, wherein:

the frame is configured for signal transmission in accordance with High-level Data-Link-Control (HDLC) protocol.

7. The apparatus in claim 1, wherein:

each transmit port includes a transmit clock which is enabled for transmitting the frame to the receiving means, the apparatus including transmit clock control means for disabling the transmit clock after the receiving means receives the frame and re-enabling the transmit clock when the path to the receive port has been connected.

8. The apparatus in claim 1, wherein:

each transmit port transmits data independently and simultaneously, each transmit port including a respective transmit clock which is enabled for transmitting a respective frame to the receiving means, the apparatus including transmit clock control means for independently disabling each clock after the receiving means receives the respective frame and re-enabling the transmit clock when the path to the receive port has been connected.

9. The apparatus in claim 8, further comprising:

arbitrating means, coupled to the determining means, for arbitrating between multiple transmit ports that each transmit data identifying a common receive port and are unconnected to the common receive port, the arbitrating means defining for the determining means the availability of the common receive port to each of the multiple transmit ports, thereby determining priority of access to the common receive port.

10. The apparatus in claim 9, wherein:

the arbitrating means defines that the common destination receive port is available to one of the arbitrated source transmit ports, responsive to the determining means determining that the connecting means does not connect the path to the common destination receive port.

11. The apparatus in claim 10, wherein:

the arbitrating means selects one of the multiple transmit ports upon defining the common receive port available to one of the multiple transmit ports.

12. The apparatus in claim 11, wherein:

the transmit clock control means disables the transmit clocks of the transmit ports that are not selected by the arbitrating means, thereby blocking data transmission from the transmit ports not selected by the arbitrating means.

13. The apparatus in claim 12, wherein:

the transmit clock control means enables the transmit clock of the selected one of the multiple transmit ports, thereby allowing data transmission from the selected transmit port to the common receive port.

14. The apparatus in claim 11, wherein:

the arbitrating means selects between the multiple transmit ports in a substantially random manner, thereby providing the multiple transmit ports a predetermined statistical distribution of access among transmit ports.

15. The apparatus in claim 10, further including:

disconnect means for disconnecting the path between a respective transmit port and a respective receive port when data transmission is completed.

16. The apparatus in claim 9, wherein:

the arbitrating means defines the common receive port as unavailable while the connecting means connects a path from one of the multiple transmit ports to the common receive port.

17. The apparatus in claim 8, wherein:

the connecting means independently connects paths from multiple transmit ports to respective recognized receive ports for simultaneous data transmission responsive to the availability of the respective receive ports.

18. Method for providing paths between a plurality of transmit ports and a plurality of receive ports, for transmitting therebetween data signals identifying a respective receive port, the method comprising the steps of:

receiving data transmitted by a plurality of transmit ports;

recognizing a respective receive port identified by the data received from each of the plurality of transmit ports;

determining an availability of each recognized receive port;

automatically connecting a respective path between each of the plurality of transmit ports and each recognized respective receive port in response to a determination that a recognized receive port is available, wherein respective paths between a multiple number of transmit ports and a corresponding multiple number of respective receive ports are concurrently connected; and enabling transmission of data between each of the plurality of transmit ports and each recognized respective receive port through the respective path, wherein the data transmitted by each transmit port comprises a frame having an information field and an address field, the address field including an identifier for identifying a respective receive port for receiving the frame, and wherein the recognizing step includes a step of disassembling each frame into separate fields for recognizing the identified receive port, the recognizing step further including the step of storing the identifier during frame dis-assembly.

19. The method in claim 18, further comprising the steps of:

arbitrating between multiple transmit ports which transmit data identifying a common receive port; and defining availability of the common receive port by assigning a priority of access to the common receive port for each of the multiple transmit ports.

* * * * *